US012594785B2

(12) United States Patent (10) Patent No.: US 12,594,785 B2
Koo et al. (45) Date of Patent: Apr. 7, 2026

(54) WHEEL DEVICE AND MOBILE ROBOT DEVICE COMPRISING SAME

(71) Applicant: SAMSUNG ELECTRONICS CO., LTD., Suwon-si (KR)

(72) Inventors: Donghan Koo, Suwon-si (KR); Minhee Lee, Suwon-si (KR); Soonheum Ko, Suwon-si (KR); Hyunsuk Kwak, Suwon-si (KR); Cheoggyu Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 368 days.

(21) Appl. No.: 18/129,518

(22) Filed: Mar. 31, 2023

(65) Prior Publication Data
US 2023/0234395 A1 Jul. 27, 2023

Related U.S. Application Data

(63) Continuation of application No. PCT/KR2021/016770, filed on Nov. 16, 2021.

(30) Foreign Application Priority Data

Dec. 21, 2020 (KR) ........................ 10-2020-0180233

(51) Int. Cl.
　B60C 7/00 (2006.01)
　B60B 9/28 (2006.01)
　(Continued)
(52) U.S. Cl.
　CPC .............. B60B 9/28 (2013.01); B60B 25/006 (2013.01); B60C 7/18 (2013.01); *B60B 2900/551* (2013.01)

(58) Field of Classification Search
　CPC ........... B60C 7/18; B60C 7/146; B60C 7/107; B60C 7/10; B60C 7/08; B60C 7/00; B60B 2900/551
　See application file for complete search history.

(56) References Cited

U.S. PATENT DOCUMENTS 6,681,822 B2　1/2004　Adams et al.
9,061,677 B2　6/2015　Jang
(Continued)

FOREIGN PATENT DOCUMENTS

CN　　105599536 A　5/2016
CN　　107160943 A　9/2017
(Continued)

OTHER PUBLICATIONS

Screenshot of "Step up the stairs! One Person Mobility Tree (NAMU)", (Dec. 4, 2018.), (https://www.youtube.com/watch?v=pyCgcX9fKlc).
(Continued)

*Primary Examiner* — Cedrick S Williams
(74) *Attorney, Agent, or Firm* — Sughrue Mion, PLLC

(57) ABSTRACT

A wheel device includes: a wheel member; a tire disposed on the outside of the wheel member, the tire comprising an inner layer, an outer layer, and a plurality of hollow pipes disposed between the inner layer and the outer layer, wherein an inner circumferential surface of the inner layer comprises grooves; a plurality of support members each having a circular arc shape; and a plurality of spoke members respectively connecting the wheel member to the plurality of support members. The plurality of spoke members are configured to move the plurality of support members between a first position and a second position. In the first position, each of the support members are disposed in the grooves. In the second position, each of the support mem- (Continued)

bers are disposed closer to a central axis of the tire than when the support members are in the first position.

16 Claims, 12 Drawing Sheets

(51) Int. Cl.

| | |
|---|---|
| *B60B 25/00* | (2006.01) |
| *B60C 7/08* | (2006.01) |
| *B60C 7/18* | (2006.01) |
| *B60C 9/00* | (2006.01) |
| *B60C 9/28* | (2006.01) |

(56) References Cited

U.S. PATENT DOCUMENTS

| | | | | |
|---|---|---|---|---|
| 9,445,960 | B2 | 9/2016 | Abughaida | |
| 9,757,978 | B1 | 9/2017 | Emigh | |
| 10,427,453 | B2 | 10/2019 | Apollonio et al. | |
| 10,427,461 | B1 | 10/2019 | Padula, II et al. | |
| 11,059,326 | B2 | 7/2021 | Hwang et al. | |
| 11,505,004 | B2 | 11/2022 | Jo et al. | |
| 2015/0032334 | A1 | 1/2015 | Jang | |
| 2016/0159213 | A1* | 6/2016 | Holmes | B60K 6/48 |
| | | | | 301/6.5 |
| 2018/0201058 | A1 | 7/2018 | Appollonio et al. | |
| 2019/0152256 | A1 | 5/2019 | Hwang et al. | |
| 2020/0276865 | A1 | 9/2020 | Jo et al. | |
| 2020/0331221 | A1* | 10/2020 | Thompson | B60C 7/18 |

FOREIGN PATENT DOCUMENTS

| | | | | | |
|---|---|---|---|---|---|
| CN | 206598673 | U | * | 10/2017 | |
| CN | 110406311 | A | * | 11/2019 | B60B 9/24 |
| CN | 111169219 | A | * | 5/2020 | B60B 9/005 |
| CN | 109050168 | B | | 8/2020 | |
| CN | 110356167 | B | | 8/2020 | |
| CN | 112026437 | A | * | 12/2020 | B60B 19/00 |
| GB | 2359526 | B | * | 8/2003 | B60C 7/08 |
| JP | 6847363 | B2 | | 3/2021 | |
| KR | 10-2007-0062312 | A | | 6/2007 | |
| KR | 10-0931217 | B1 | | 12/2009 | |
| KR | 10-2011-0011138 | A | | 2/2011 | |
| KR | 10-1215080 | B1 | | 12/2012 | |
| KR | 10-1491284 | B1 | | 2/2015 | |
| KR | 10-1663634 | B1 | | 10/2016 | |
| KR | 10-2005417 | B1 | | 7/2019 | |
| KR | 10-2020-0062695 | A | | 6/2020 | |
| KR | 10-2020-0105131 | A | | 9/2020 | |

OTHER PUBLICATIONS

International Search Report (PCT/ISA/210) issued by the International Searching Authority on Mar. 4, 2022 in corresponding International Application No. PCT/KR2021/016770.

Written Opinion (PCT/ISA/237) issued by the International Searching Authority on Mar. 4, 2022 in corresponding International Application No. PCT/KR2021/016770.

Office Action issued May 26, 2025 by the Korean Patent Office for KR Patent Application No. 10-2020-0180233.

* cited by examiner

1000

1000

WHEEL DEVICE AND MOBILE ROBOT DEVICE COMPRISING SAME

CROSS-REFERENCE TO RELATED APPLICATIONS

This application is a continuation application of International Application No. PCT/KR2021/016770, filed on Nov. 16, 2021, which claims priority to Korean Patent Application No. 10-2020-0180233 filed on Dec. 21, 2020 in the Korean Intellectual Property Office, the disclosures of which are herein incorporated by reference.

TECHNICAL FIELD

The present disclosure relates to a wheel device and a mobile robot device including the same, and more particularly, to a wheel device which may enable stable driving by minimizing vibration of the center of gravity by sufficiently deforming a tire when passing an obstacle, and limiting tire deformation during normal times, and a mobile robot device including the same.

BACKGROUND

A mobile robot using ordinary wheels may have a problem in that the center of gravity may vibrate up and down greatly when passing an obstacle having a step. A mobile robot using a caterpillar track may have smaller vibration at its the center of gravity when passing such an obstacle but is inefficient when driving on a flat surface. Research has been ongoing with respect to mobile robots that deform their structure so that they are moved using wheels on a flat surface and moved using tracks when passing an obstacle. However, current techniques are deficient in that structural deformation may take a long time.

Additionally, a mobile robot using a non-pneumatic tire (NPT) may allow for easier tire deformation but may result in a problem of inefficient driving even on a flat surface because its tires are unintentionally deformed by their own weights while having smaller vibration of the center of gravity when passing an obstacle.

SUMMARY

The present disclosure provides a wheel device which may enable stable driving by minimizing vibration of the center of gravity by sufficiently deforming a tire when passing an obstacle, and limiting tire deformation during normal times, and a mobile robot device including the same.

A wheel device may include a wheel member; a tire disposed on the outside of the wheel member, the tire comprising an inner layer, an outer layer, and a plurality of hollow pipes disposed between the inner layer and the outer layer, wherein an inner circumferential surface of the inner layer comprises grooves; a plurality of support members each having a circular arc shape; and a plurality of spoke members respectively connecting the wheel member to the plurality of support members. The plurality of spoke members are configured to move the plurality of support members between a first position and a second position. In the first position, each of the support members are disposed in the grooves. In the second position, each of the support members are disposed closer to a central axis of the tire than when the support members are in the first position.

The wheel member may include a deforming device configured to move the plurality of spoke members in a radial direction of the tire.

The deforming device may further include a guide plate comprising a plurality of guide rails into which the plurality of spoke members are respectively inserted.

Each of the plurality of spoke members may include a pin passing through one end thereof. The deforming device may further include a cam member configured to rotate about the central axis of the tire, the cam member comprising a plurality of slits, each of the plurality of slits having a spiral shape. The pin of each of the plurality of spoke members may be respectively inserted into each of the plurality of slits.

The cam member may include: a first cam member disposed on a first side of the guide plate, a second cam member disposed on a second side of the guide plate, and a connecting member connecting the first and second cam members to each other through the guide plate.

The deforming device may include: a camshaft connected to the cam member, and a first motor configured to rotate the camshaft to move the pin along each of the plurality of slits.

Each of the plurality of support members may include: a protrusion region convexly protruding from a first end of each of the plurality of support members and a concave region positioned at a second end of each of the plurality of support members wherein the concave region has a shape configured to engage with the protrusion region.

The wheel member may include a rim member supporting the inner layer of the tire that is configured to rotate integrally with the tire.

The rim member may include: a first rim member disposed on a first side of the plurality of spoke members, and a second rim member disposed on a second side of the plurality of spoke members.

The wheel member may further include: a wheel shaft connected to the rim member, and a second motor configured to rotate the wheel shaft.

The plurality of hollow pipes may be arranged staggered in a zigzag pattern in a radial direction of the tire.

Each of the plurality of hollow pipes may have a rectangular parallelepiped shape.

A mobile robot device may include: a base; and at least three wheel devices installed on a lower portion of the base. The wheel device may include: a wheel member; a tire disposed on the outside of the wheel member, the tire comprising an inner layer, an outer layer, and a plurality of hollow pipes disposed between the inner layer and the outer layer, wherein an inner circumferential surface of the inner layer comprises grooves; a plurality of support members each having a circular arc shape; and a plurality of spoke members respectively connecting the wheel member to the plurality of support members. The plurality of spoke members may be configured to move the plurality of support members between a first position and a second position. In the first position, each of the support members may be disposed in the grooves. In the second position, each of the support members may be disposed closer to a central axis of the tire than when the support members are in the first position.

The wheel member may include a deforming device configured to move the plurality of spoke members in a radial direction of the tire.

The mobile robot device may further include: an obstacle detection sensor configured to detect an obstacle around the mobile robot device; and a processor disposed in electronic communication with the obstacle detection sensor, the processor being configured to control the deforming device to move the support member to the second position when the processor determines that the obstacle exists in front of the mobile robot device based on a sensing value received by the obstacle detection sensor.

The deforming device may further include a guide plate comprising a plurality of guide rails into which the plurality of spoke members are respectively inserted. Each of the plurality of spoke members may include a pin passing through one end thereof, and wherein the deforming device further comprises a cam member configured to rotate about the central axis of the tire, the cam member comprising a plurality of slits, each of the plurality of slits having a spiral shape. The pin of each of the plurality of spoke members may be respectively inserted into each of the plurality of slits.

The cam member may include: a first cam member disposed on a first side of the guide plate, a second cam member disposed on a second side of the guide plate, and a connecting member connecting the first and second cam members to each other through the guide plate. The deforming device may include: a camshaft connected to the cam member, and a first motor configured to rotate the camshaft to move the pin along each of the plurality of slits.

Each of the plurality of support members may include: a protrusion region convexly protruding from a first end of each of the plurality of support members and a concave region positioned at a second end of each of the plurality of support members. The concave region may have a shape configured to engage with the protrusion region.

The wheel member may include: a rim member supporting the inner layer of the tire that is configured to rotate integrally with the tire, a wheel shaft connected to the rim member, and a second motor configured to rotate the wheel shaft. The rim member may include: a first rim member disposed on a first side of the plurality of spoke members, and a second rim member disposed on a second side of the plurality of spoke members.

The plurality of hollow pipes may be arranged staggered in a zigzag pattern in a radial direction of the tire. Each of the plurality of hollow pipes may have a rectangular parallelepiped shape.

DETAILED DESCRIPTION

Embodiments described below are illustratively provided to assist in understanding of the present disclosure, and it is to be understood that the present disclosure may be variously modified and executed unlike the embodiments described herein. In describing the present disclosure, omitted is a detailed description of a case where it is decided that the detailed description for the known functions or components related to the present disclosure may unnecessarily obscure the gist of the present disclosure. Further, the accompanying drawings are not illustrated to scale, and sizes of some of components may be exaggerated to assist in the understanding of the present disclosure.

A term used in this specification or the claims is selected in consideration of its function in the present disclosure. However, this term may be changed based on intentions of those skilled in the art to which the present disclosure pertains, legal or technical interpretations, and emergences of new technology. In addition, some terms are arbitrarily selected by the applicant. This term may be interpreted to have the meaning defined in this specification, and if there is no specific definition of the term, the term may be interpreted based on a general content of this specification and common technical knowledge in the art.

In the present disclosure, an expression "have," "may have," "include," "may include" or the like, indicates the existence of a corresponding feature (for example, a numerical value, a function, an operation or a component such as a part), and does not exclude the existence of an additional feature.

In addition, this specification describes components necessary for describing each embodiment of the present disclosure, and is not necessarily limited thereto. Accordingly, some components may be changed or omitted, and other components may be added. In addition, the components may be distributed and arranged in different independent devices.

Furthermore, the embodiments of the present disclosure are described in detail with reference to the accompanying drawings and the contents shown in the accompanying drawings, and the present disclosure is not limited or restricted to the embodiments.

Hereinafter, the present disclosure is described in more detail with reference to the accompanying drawings.

Figure 1:
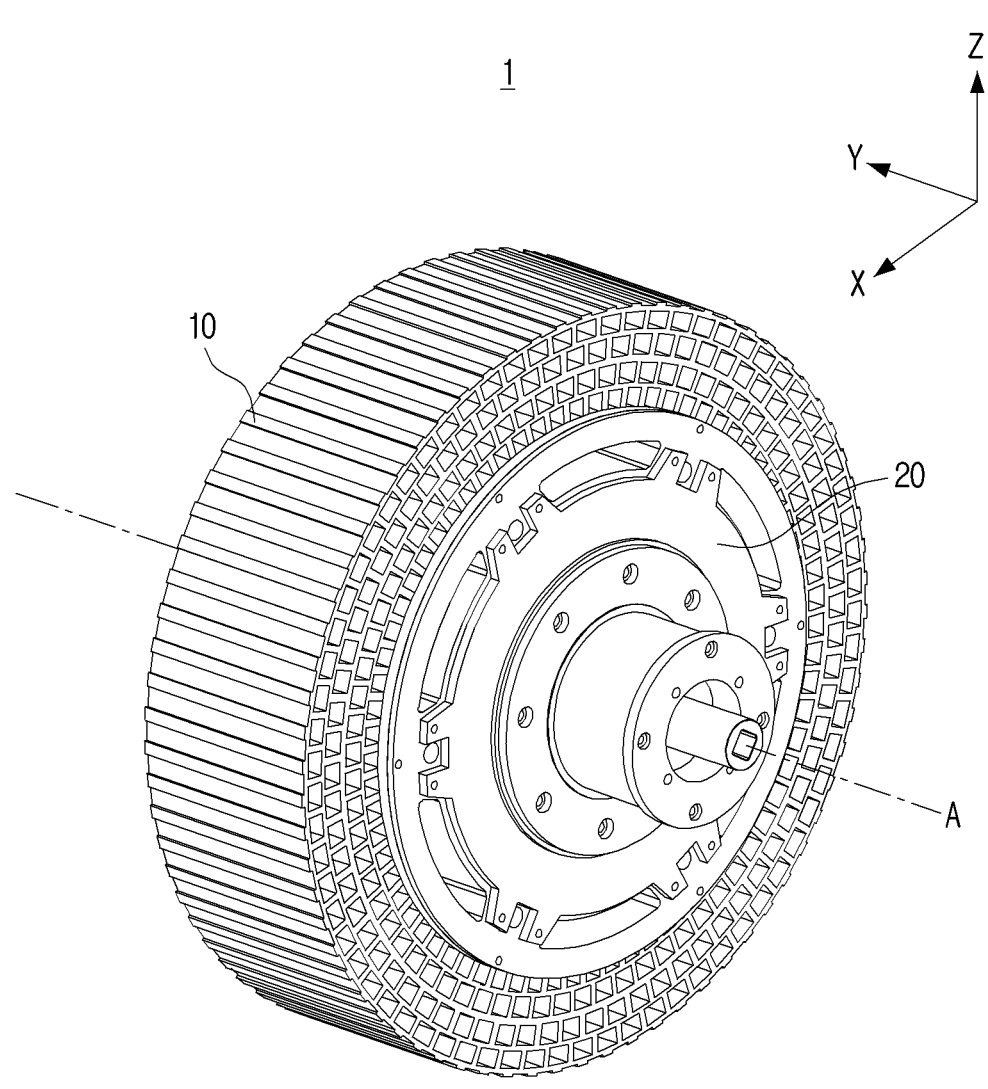
FIG. 1 is a perspective view of a wheel device according to an embodiment of the present disclosure.
Figure 2:
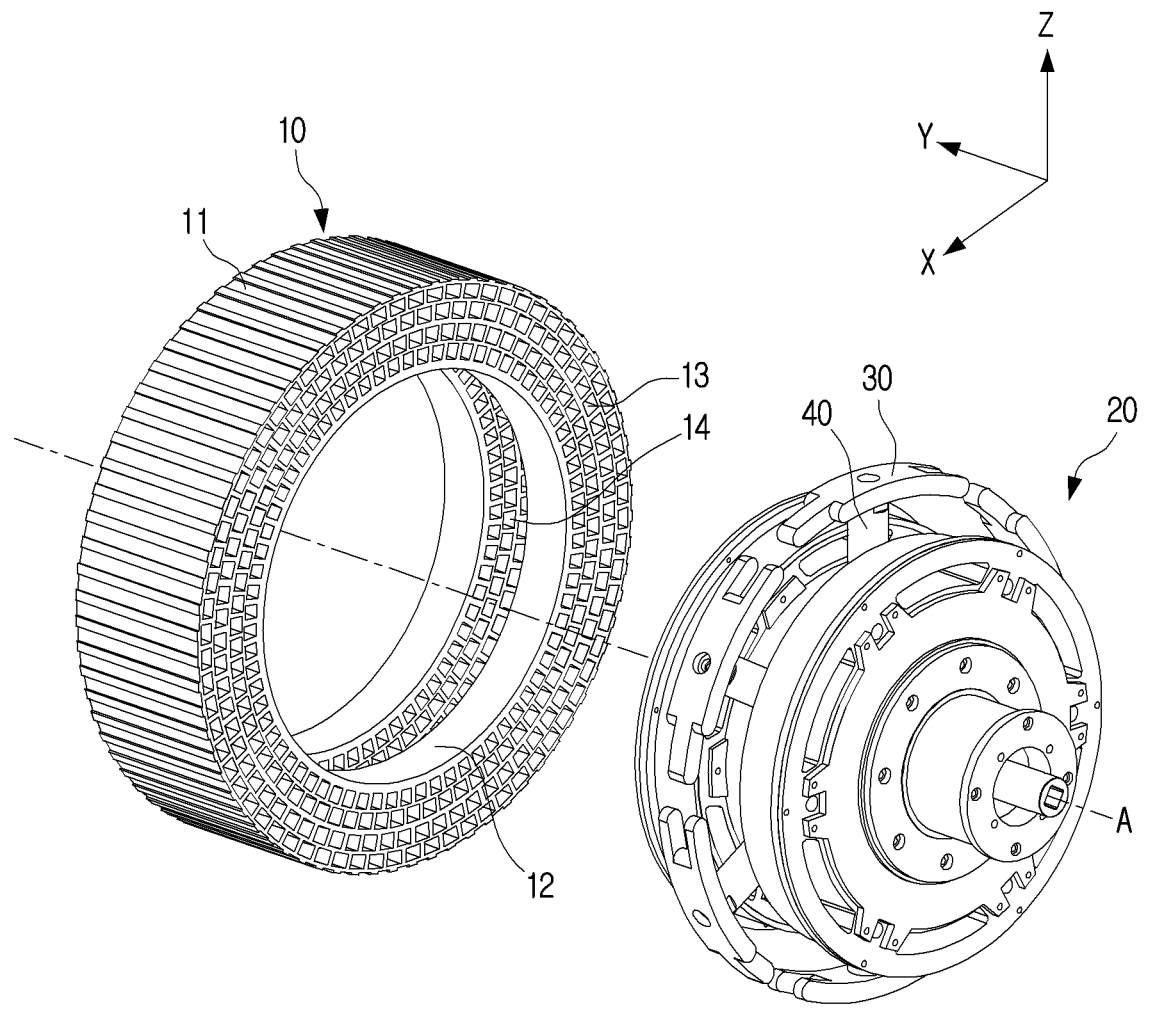
FIGS. 2 and 3 are exploded perspective views of the wheel device and a wheel member, respectively.
Figure 3:
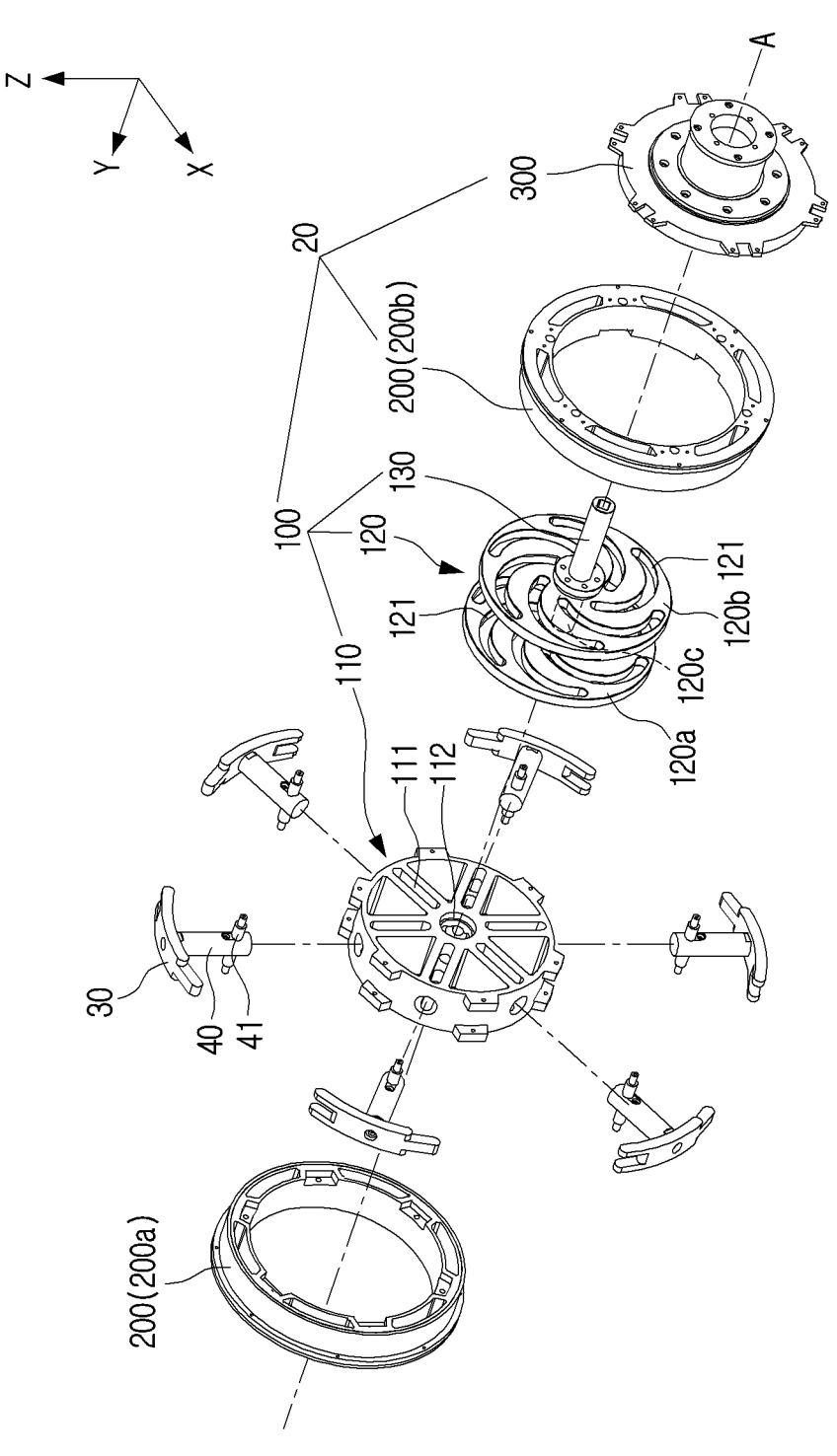

FIG. 1 is a perspective view of a wheel device according to an embodiment of the present disclosure. FIGS. 2 and 3 are exploded perspective views of the wheel device and a wheel member, respectively.

Referring to FIGS. 1 to 3, a wheel device 1 may include a tire 10, a wheel member 20, a plurality of support members 30, and a plurality of spoke members 40.

The wheel device 1 may be a device having a substantially cylindrical shape and rotated while being in contact with the ground to be moved forward or backward.

The tire 10 may be a part of the wheel device 1 that is in contact with the ground, and may support an entire load of the wheel device 1. In addition, the tire 10 may withstand centrifugal force, centripetal force, and impact from the ground when the wheel device 1 is driven.

The tire 10 may form an outer circumferential surface of the wheel device 1 and, may act as an impact absorber without air injection unlike a conventional pneumatic tire. That is, the tire 10 may be made of a flexible airless tire or a non-pneumatic tire (NPT).

The tire 10 may be made of an elastic material such as rubber or silicone, and deformed into various shapes.

The tire 10 may be disposed on the outside of the wheel member 20, include a plurality of hollow pipes 13 arranged between the outer layer 11 and inner layer 12 thereof, and have grooves 14 formed in an inner circumferential surface of the inner layer 12.

A plurality of protrusions may be formed on an outer circumferential surface of the outer layer 11. The drawings show that each of the plurality of protrusions has a shape of a rectangular parallelepiped parallel to the outer layer in the width direction, is not limited to this shape, and may have various shapes as long as the tire has increased frictional force with the ground.

The grooves 14 may be formed in a middle region of the inner layer 12 in the width direction. A region of the inner layer 12 where the grooves 14 are formed may be closer to the outer layer 11 than its region where the grooves 14 are not formed.

The tire 10 may have the same thickness as an interval between the outer layer 11 and the inner layer 12. That is, a region of the tire 10 where the grooves 14 are formed may have a smaller thickness than its rest region.

The wheel member 20 may support the inner layer 12 of the tire 10. In detail, the wheel member 20 may support the rest region of the inner circumferential surface of the inner layer 12 where the grooves 14 are not formed.

The support member 30 may have a circular arc shape. The respective outer circumferential surfaces of the plurality of support members 30 may be combined with each other to have the circular shape. The outer circumferential surface of the support member 30 may have a curvature corresponding to that of the inner layer 12 of the tire 10.

The plurality of spoke members 40 may respectively connect the wheel member 20 to the plurality of support members 30. In detail, the plurality of spoke members 40 may connect a guide plate 110 to each of the plurality of support members 30.

The plurality of spoke members 40 may move the plurality of support members 30 to a first position in which the support member is disposed in the groove 14 or to a second position in which the support member is disposed closer to a central axis "A" of the tire 10 than in the first position.

The plurality of spoke members 40 may be implemented as straight links, and may be linearly moved by a deforming device 100 described below in a radial direction of the tire 10.

The plurality of support members 30 and the plurality of spoke members 40 may be integrally formed with each other, and made of a rigid body having stiffness greater than a predetermined value. In addition, the plurality of support members 30 and the plurality of spoke members 40 may be radially arranged based on the central axis "A" of the tire 10 at regular intervals.

The plurality of support members 30 and the plurality of spoke members 40 may each be three to eight members, and are not limited to these numbers.

The wheel member 20 may include the deforming device 100, a rim member 200, and a wheel shaft 300.

The deforming device 100 may move the plurality of spoke members 40 in the radial direction of the tire 10. That is, the deforming device 100 may move the plurality of spoke members 40 to be positioned close to or away from the central axis "A" of the tire 10.

The deforming device 100 may include the guide plate 110, a cam member 120, a camshaft 130, and a first motor (not shown).

The guide plate 110 may be disposed in the middle region of the wheel device 1 in an axial direction, and have a disk shape.

The guide plate 110 may include a plurality of guide rails 111 into which the plurality of spoke members 40 are respectively inserted.

The number of guide rails 111 may be the same as the number of the plurality of spoke members 40, and the guide rail may have a substantially rectangular parallelepiped shape. In addition, the guide rails 111 may be radially arranged based on the central axis "A" of the tire 10, and have a plurality of spaces into which the plurality of spoke members 40 are respectively inserted.

Movements of the plurality of spoke members 40 in a circumferential direction of the tire 10 may be restricted by the shape of an inner space of the guide rail 111 described above, and the plurality of spoke members 40 may be provided with a straight movement path by the guide rail 111 for the spoke member to be moved only in the radial direction of the tire 10.

Each of the plurality of spoke members 40 may include a pin 41 passing through one end thereof.

The cam member 120 may be rotated based on the central axis "A" of the tire 10. The cam member 120 may include a plurality of slits 121 each of which has a spiral shape and into which the pins 41 of the plurality of spoke members 40 are respectively inserted.

The cam member 120 may be a plate having a predetermined thickness and have a circular shape.

When the cam member 120 is rotated, the pin 41 inserted into the slit 121 may be pushed by the cam member 120. That is, the pin 41 may be moved along the slit 121 while being inserted into the slit 121, and the spoke member 40 may be simultaneously moved along the guide rail 111 of the guide plate 110. Accordingly, the plurality of spoke members 40 may be moved away from or close to the central axis "A" of the tire 10 in the radial direction of the tire 10.

The cam member 120 may include a first cam member 120a, a second cam member 120b, and a connecting member 120c. The first and second cam members 120a and 120b may have the same shapes as each other. In addition, the first and second cam members 120a and 120b and the connecting member 120c may be integrally formed with each other to be rotated together based on the central axis "A" of the tire 10.

The first cam member 120a may be disposed on one side of the guide plate 110. In addition, the second cam member 120b may be disposed on the other side of the guide plate 110. That is, the guide plate 110 may be disposed between the first and second cam members 120a and 120b.

The connecting member 120c may pass through the guide plate 110 and connect the first and second cam members 120a and 120b to each other. In detail, the connecting member 120c may have a cylindrical shape and pass through a through hole 112 formed in the center of the guide plate 110.

The pin 41 of the spoke member 40 may have one end and the other end respectively inserted into the slit 121 formed in the first cam member 120a and the slit 121 formed in the second cam member 120b, and the spoke member 40 may thus be more stably moved in the radial direction of the tire 10.

The camshaft 130 may be connected to the cam member. The camshaft 130 may be disposed along the central axis "A" of the tire 10.

The first motor may rotate the camshaft 130 for the pin 41 to be moved along the slit 121. Movement directions of the pin 41 and the spoke member 40 may be determined based on a direction in which the first motor rotates the camshaft 130.

The rim member 200 may support the inner layer 12 of the tire 10 and may be rotated integrally with the tire 10. The rim member 200 may be in contact with the inner circumferential surface of the inner layer 12 of the tire 10, on which the grooves 14 are not formed. An outer circumferential surface of the rim member 200 may be bonded to the inner layer 12 of the tire 10.

The rim member 200 may have a shape of a cylinder having an open center and have a diameter corresponding to that of the inner layer 12 of the tire 10.

The rim member 200 may include a first rim member 200a disposed on one side of the plurality of spoke members 40, and a second rim member 200b disposed on the other side of the plurality of spoke members 40. That is, the plurality of spoke members 40 may be disposed between the first and second rim members 200a and 200b.

The wheel shaft 300 may be connected to the rim member 200. The wheel member 20 may further include a second motor (not shown) rotating the wheel shaft 300. In detail, the wheel shaft 300 may be integrally formed with the second rim member 200b and rotated together.

That is, when the second motor rotates the wheel shaft 300, the tire 10, the wheel member 20, the support member 30, and the spoke member 40 may be all rotated based on the central axis "A", and the entire wheel device 1 may be moved forward or backward.

The camshaft 130 may pass through the wheel shaft 300 and the second rim member 200b to be connected to the cam member 120.

Figure 4:
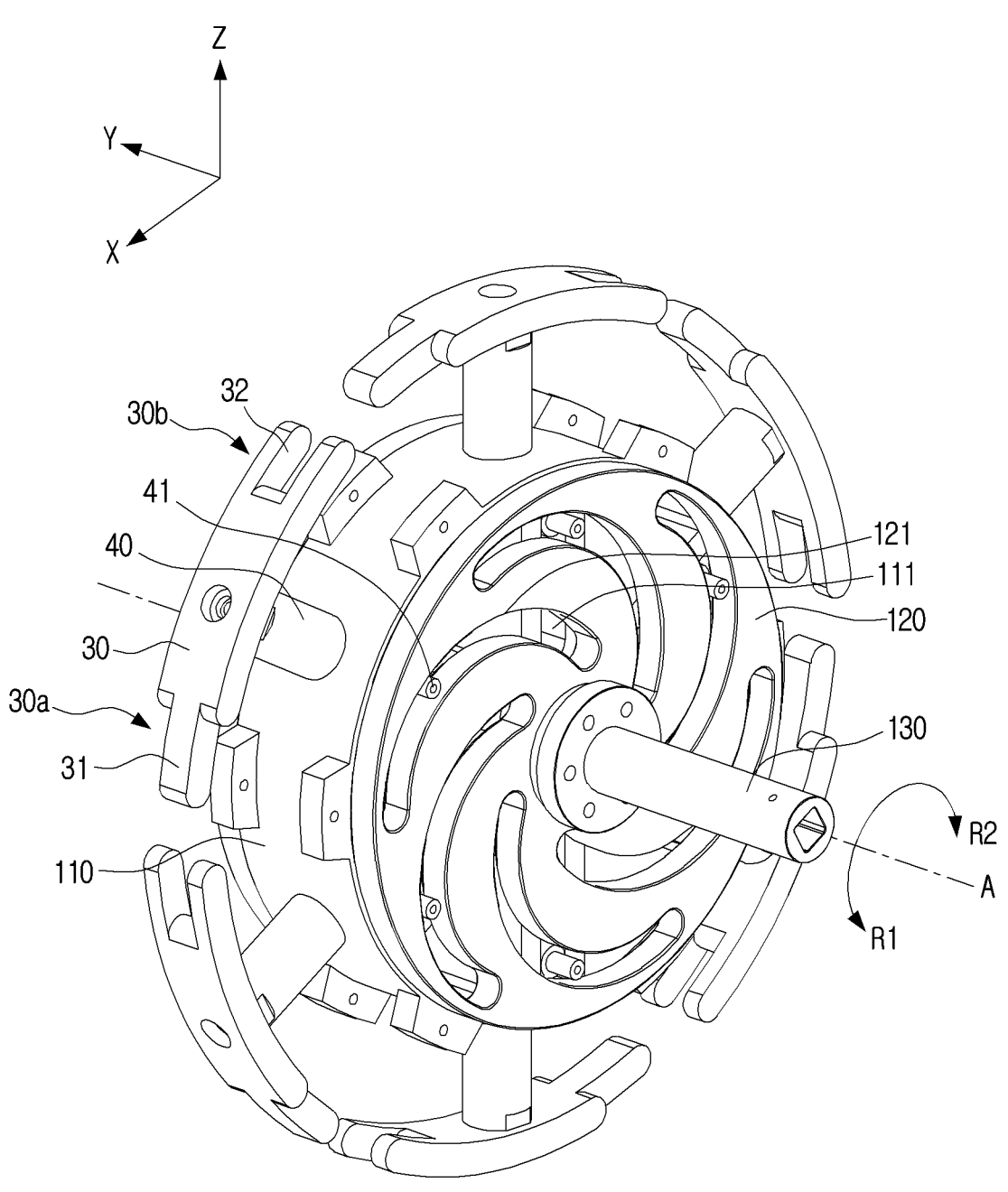
FIGS. 4 and 5 are perspective views of a deforming device when a support member is in a first position and a second position, respectively.
Figure 5:
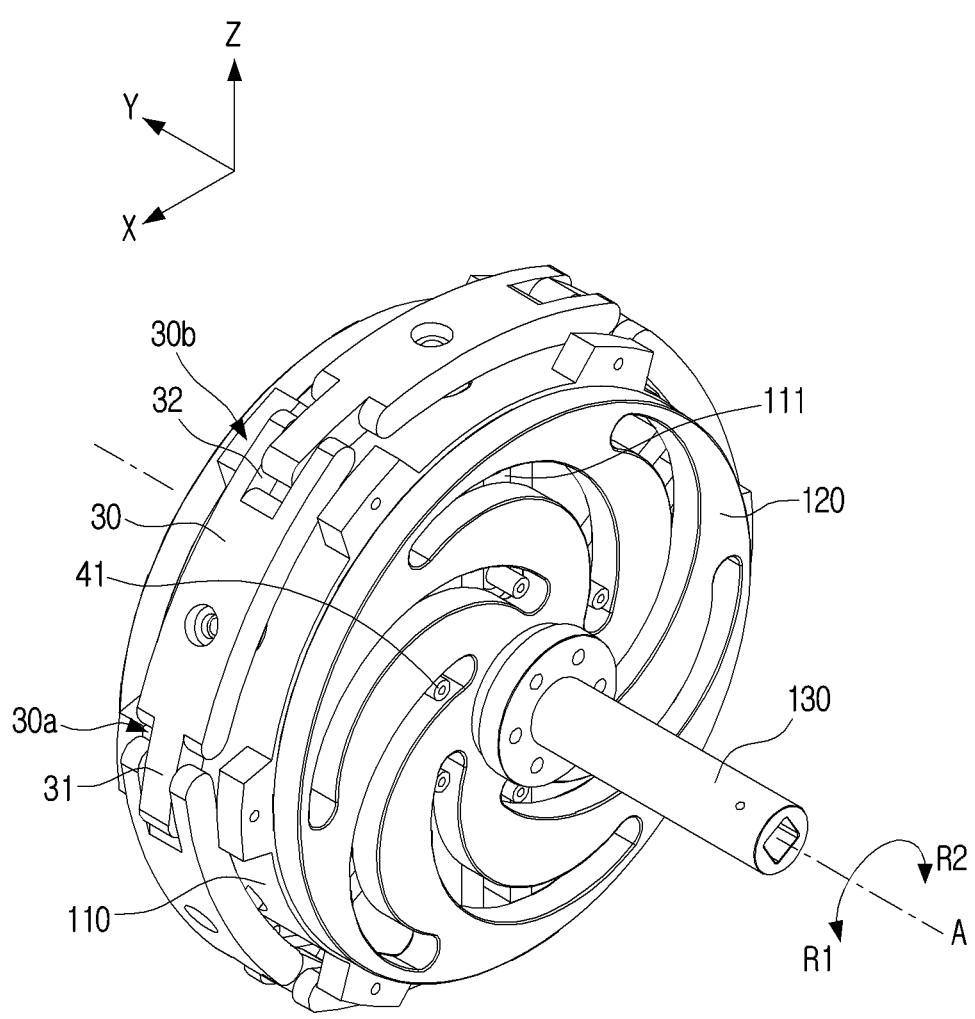

FIGS. 4 and 5 are perspective views of the deforming device when the support member is in the first position and the second position, respectively.

Referring to FIGS. 4 and 5, the support member 30 may be positioned in the first position in which the support member is disposed in the groove 14 or in the second position in which the support member is disposed closer to the central axis "A" of the tire 10 than in the first position.

In detail, the cam member 120 integrally formed with the camshaft 130 may also be rotated in an R1 direction when the first motor rotates the camshaft 130 based on the central axis "A" of the tire 10 in the R1 direction.

Accordingly, the pin 41 of the spoke member 40 that is inserted into the spiral-shaped slit 121 of the cam member 120 may be moved closer to the central axis "A" of the tire 10. Simultaneously, the spoke member 40 may be moved along the guide rail 111 disposed along the radial direction of the tire 10 to be closer to the central axis "A" of the tire 10, and the support member 30 may be moved from the first position to the second position.

On the other hand, the support member 30 may be moved from the second position to the first position when the first motor rotates the camshaft 130 based on the central axis "A" of the tire 10 in an R2 direction.

The support member 30 may include a protrusion region 31 convexly protruding from one end 30a and a concave region 32 positioned at the other end 30b and having a shape engaged with a shape of the protrusion region 31.

Accordingly, the protrusion region 31 and concave region 32 of each of the plurality of support members 30 may be engaged with each other, and thus be easily moved to the first position or the second position without interfering with each other.

In addition, lengths of the plurality of support members 30 spaced apart from each other may be shortened to form a continuous circle as much as possible even when the plurality of support members 30 are moved from the second position to the first position and an entire radius is thus expanded. Accordingly, the plurality of support members 30 may more stably support the inner layer 12 of the tire 10 without gaps.

Figure 6:
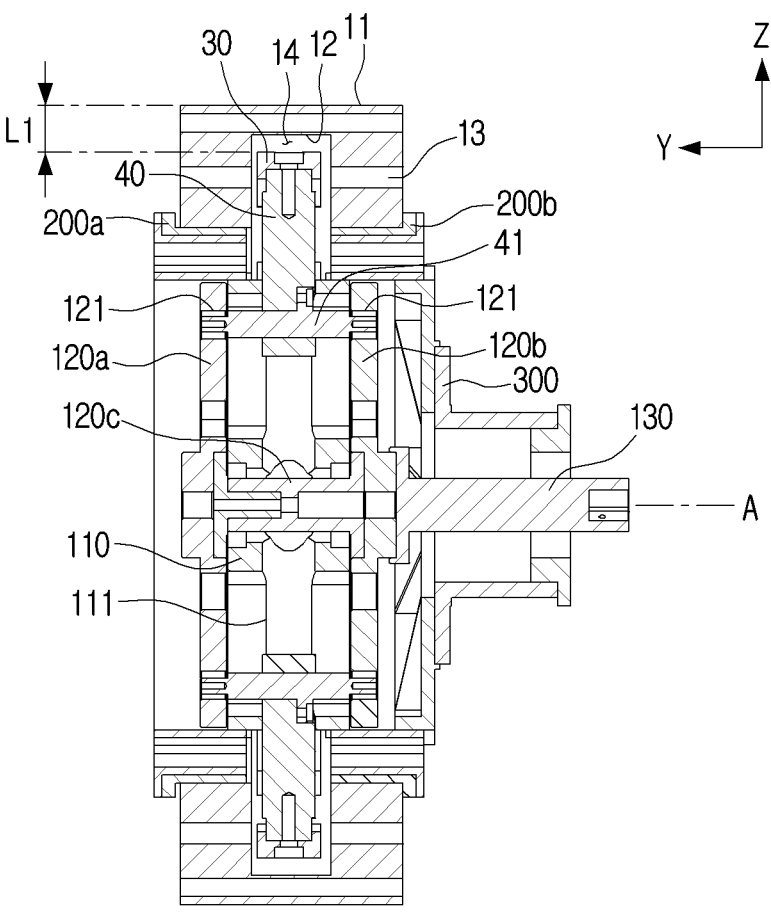
FIGS. 6 and 7 are cross-sectional views of the wheel device when the support member is in the first position and the second position, respectively.
Figure 7:
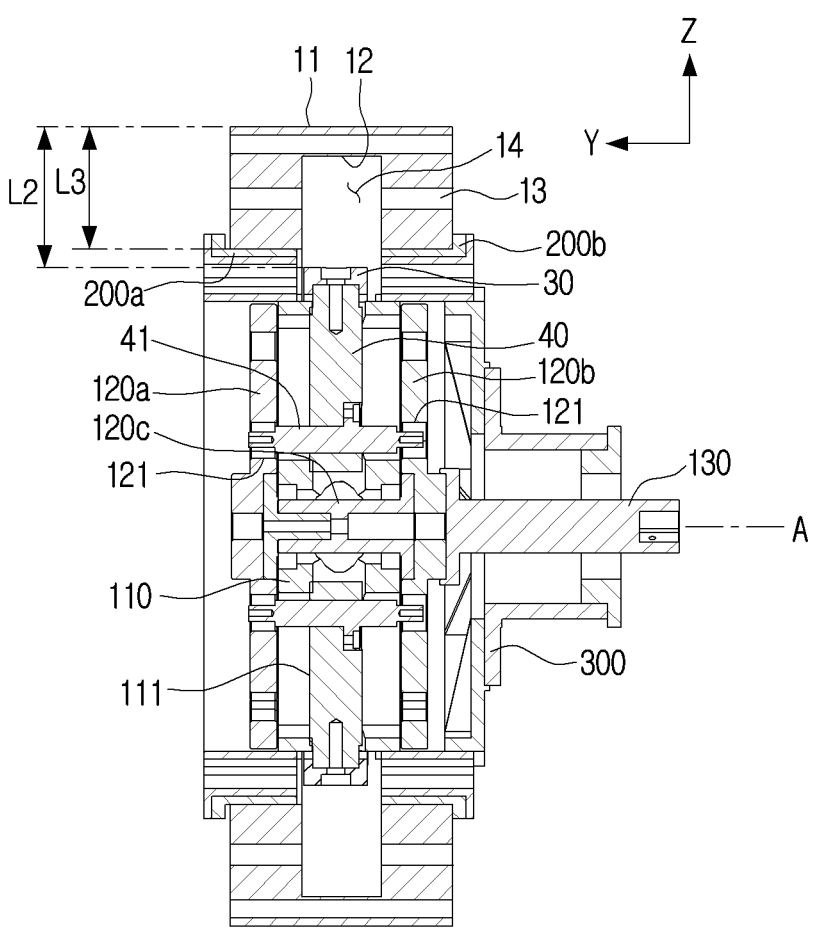

FIGS. 6 and 7 are cross-sectional views of the wheel device when the support member is in the first position and the second position, respectively.

Referring to FIG. 6, the outer layer 11 of the tire 10 and the outer circumferential surface of the support member 30 may be spaced apart from each other by a length of L1. The first position of the support member 30 is not limited to that shown in the drawing, and the support member 30 may be in the first position and in contact with the inner layer 12 of the tire 10.

The support member 30 may be positioned in the first position, and the outer layer 11 of the tire 10 may thus be deformed only to a position where the outer circumferential surface of the positioned support member 30 is positioned in the groove 14. That is, the outer layer 11 of the tire 10 may be deformed only by the length of L1.

Accordingly, a contact area between the tire 10 and the ground may be minimized, thereby minimizing frictional force of the tire with the ground when the wheel device 1 is driven on a flat surface while the support member 30 is in the first position. That is, in a state where the support member 30 is in the first position, the tire 10 may be rotated easily like a general pneumatic tire while its deformation is minimized.

Referring to FIG. 7, the outer layer 11 of the tire 10 and the outer circumferential surface of the support member 30 may be spaced apart from each other by a length L2 longer than the length of L1. The second position of the support member 30 is not limited to that shown in the drawing, and the support member 30 may be in the second position and disposed in the groove 14.

The support member 30 may be positioned in the second position, and a region of the outer layer 11 of the tire 10 that corresponds to the groove 14 may thus be deformed as much as the length of L2, and the rest of the region may be deformed as much as a length of L3. L3 may be a length between the outer layer 11 of the tire 10 and the outer circumferential surface of the rim member 200, and longer than the length of L1.

Accordingly, the tire 10 may be deformed sufficiently large when the wheel device 1 passes the obstacle having a step while the support member 30 is in the second position to enable the wheel device 1 to have minimized vertical vibration of its center of gravity, and the wheel device may thus stably pass the obstacle without shaking.

Figure 8:
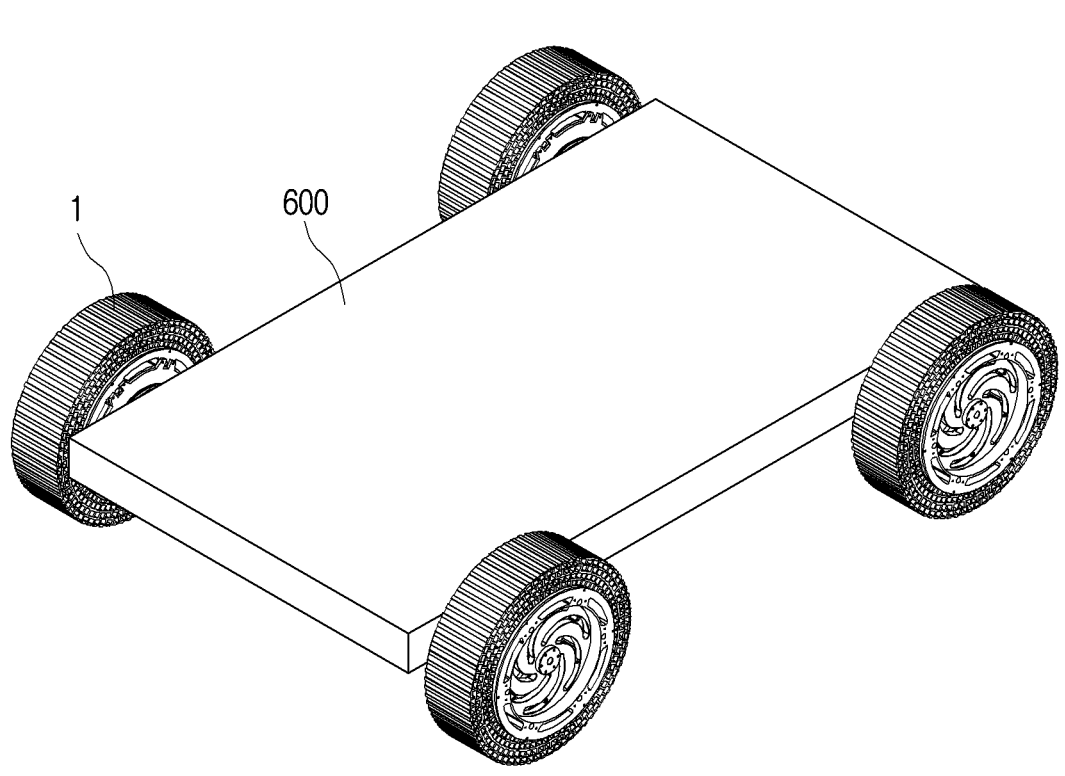
FIG. 8 is a perspective view of a mobile robot device according to another embodiment of the present disclosure.
Figure 9:
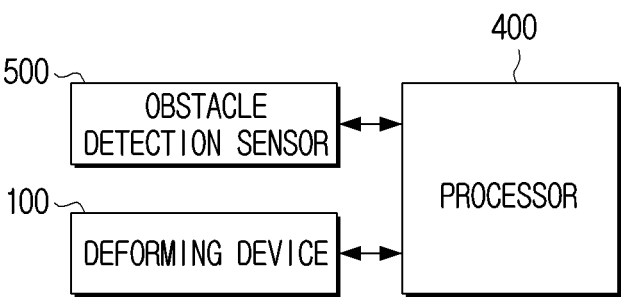
FIG. 9 is a block diagram for explaining a control process of the mobile robot device.
Figure 10:
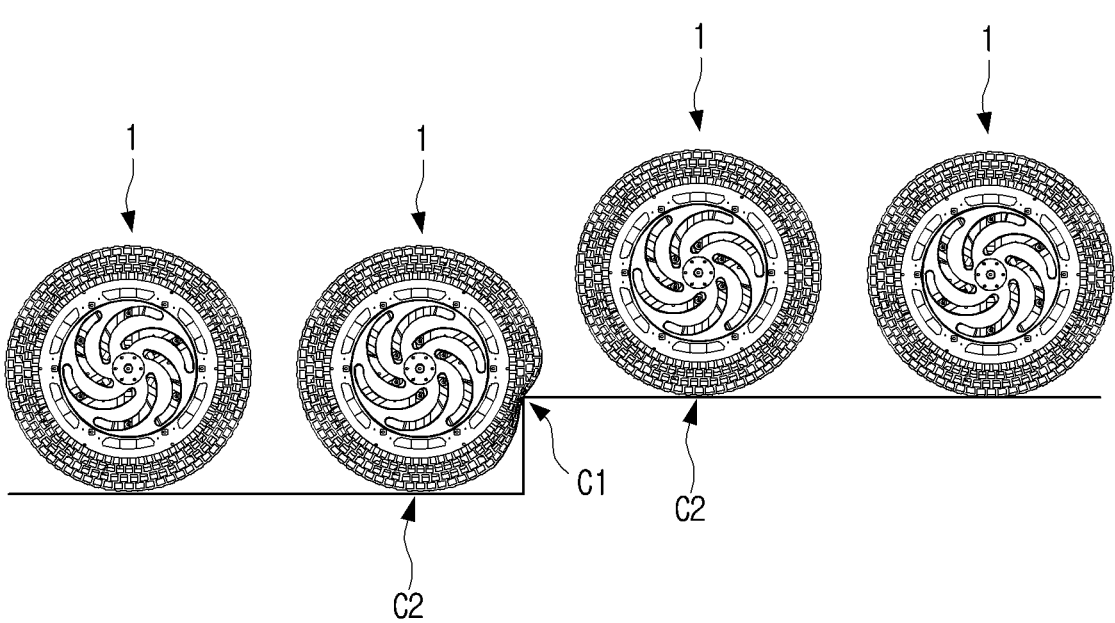
FIG. 10 is a view schematically showing a process in which the mobile robot device passes an obstacle.

FIG. 8 is a perspective view of a mobile robot device according to another embodiment of the present disclosure. FIG. 9 is a block diagram for explaining a control process of the mobile robot device. FIG. 10 is a view schematically showing a process in which the mobile robot device passes an obstacle.

Referring to FIGS. 8 to 10, a mobile robot device 1000 may include the wheel device 1, a processor 400, an obstacle detection sensor 500, and a base 600.

At least three wheel devices 1 may be provided and rotatably installed on a lower portion of the base 600. When the wheel device 1 is rotated by the second motor, the mobile robot device 1000 may be moved forward, backward or make a turn.

The processor 400 may control overall operations of the mobile robot device 1000. To this end, the processor 400 may include one or more of a central processing unit (CPU), an application processor (AP), and a communication processor (CP). The processor 400 may be a microcontroller (or micro control unit, MCU).

The processor 400 may drive an operating system or an application program to control hardware or software components connected to the processor 400, and perform various kinds of data processing and calculations. In addition, the processor 400 may load and process instructions or data received from at least one of other components in the volatile memory, and store various data in the non-volatile memory.

The obstacle detection sensor 500 may detect the obstacle around the mobile robot device 1000. The obstacle detection sensor 500 may be a camera capturing an image of a surrounding environment of the mobile robot device 1000, and its type is not limited thereto.

The processor 400 may control the deforming device 100 to move the support member 30 to the second position when determining that the obstacle exists in front of the mobile robot device 1000 based on a sensing value detected by the obstacle detection sensor 500.

The processor 400 may control the deforming device 100 to move the support member 30 to the first position when determining that no obstacle exists in front of the mobile robot device 1000 based on the sensing value detected by the obstacle detection sensor 500.

In detail, the support member 30 of the wheel device 1 may normally be in the first position, be moved to the second position in front of the obstacle, pass the obstacle in that state, and return to the first position after completely passing the obstacle.

Accordingly, the mobile robot device 1000 may perform efficient driving by using the tire 10 having a deformation amount corresponding to each case by moving the support member 30 to the first position or second position based on a case of being driven on a general flat surface or passing the obstacle having a step.

Figure 11:
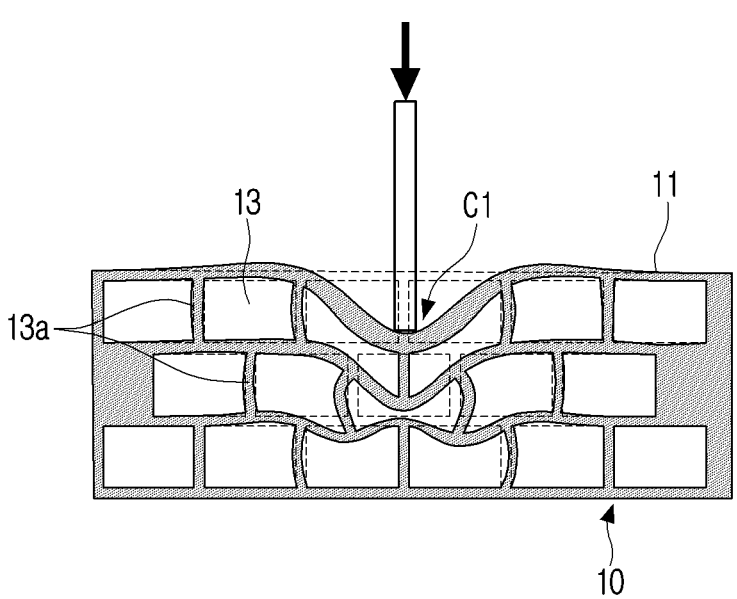
FIGS. 11 and 12 are views for explaining tire deformation degree based on a contact area of a tire with the ground.
Figure 12:
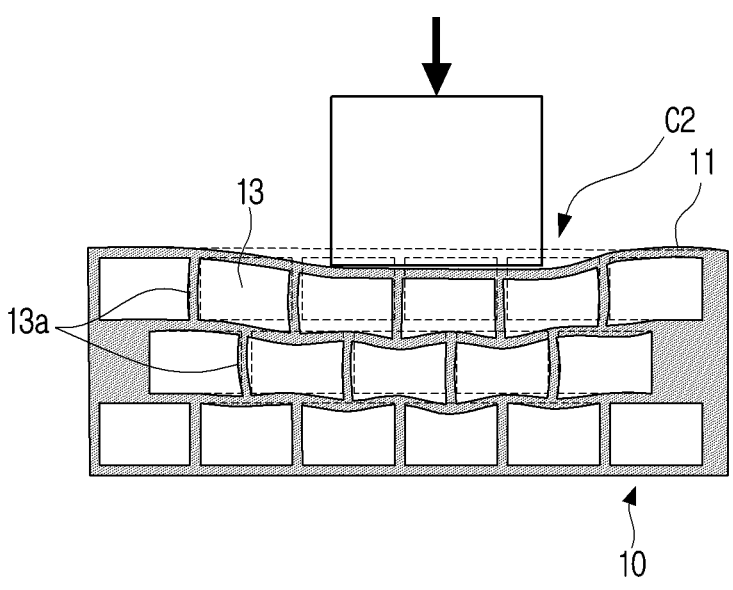

FIGS. 11 and 12 are views for explaining tire deformation degree based on the contact area of the tire with the ground.

Referring to FIGS. 11 and 12, the plurality of hollow pipes 13 of the tire 10 may be arranged staggered in a zigzag pattern in the radial direction of the tire 10. In addition, each of the plurality of hollow pipes 13 of the tire 10 may have the rectangular parallelepiped shape.

In detail, the hollow pipes 13 may form a plurality of layers in the radial direction of the tire 10, and support pillars 13a each forming a circumference of the hollow pipe 13 of each layer may be arranged staggered in the zigzag pattern.

As the hollow pipe 13 has the above-described shape, the tire 10 may be deformed sufficiently large when pressure is concentrated on a small area of the outer layer 11 of the tire 10 as shown in FIG. 11.

When the pressure is applied to a large area of the outer layer 11 of the tire 10 as shown in FIG. 12, the tire 10 may be deformed sufficiently small because the pressure is evenly distributed over several hollow pipes 13.

Referring to FIG. 10, the tire 10 may come into contact with a small area of the ground at a first ground-contact point C1. In addition, the tire 10 may come into contact with a large area of the ground at a second ground-contact point C2.

That is, the tire 10 may be deformed sufficiently large at the first ground-contact point C1 in contact with a corner of the obstacle, and thus pass the obstacle while minimizing the vertical vibration of its center of gravity.

In addition, the tire 10 may be deformed sufficiently small at the second ground-contact point C2 in contact with the flat surface, a height of the entire wheel device 1 may thus be maintained sufficiently large to pass the obstacle, the center of gravity may not be excessively moved downward, and the tire may thus easily pass the obstacle having a step.

Although the embodiments are shown and described in the present disclosure as above, the present disclosure is not limited to the above-mentioned specific embodiments, and may be variously modified by those skilled in the art to which the present disclosure pertains without departing from the gist of the present disclosure as claimed in the accompanying claims. These modifications should also be understood to fall within the scope of the present disclosure as claimed in the following claims.

The invention claimed is:

1. A wheel device comprising:
a wheel member;
a tire disposed on the outside of the wheel member, the tire comprising an inner layer, an outer layer, and a plurality of hollow pipes disposed between the inner layer and the outer layer, wherein an inner circumferential surface of the inner layer comprises at least one groove;
a plurality of support members each having a circular arc shape; and
a plurality of spoke members respectively connecting the wheel member to the plurality of support members relative to the at least one groove,
wherein the plurality of spoke members are configured to move the plurality of support members between a first position and a second position,
wherein, in the first position, each of the plurality of support members are disposed in the at least one groove, and
wherein, in the second position, each of the plurality of support members are disposed closer to a central axis of the tire than when the plurality of support members are in the first position,
wherein the wheel member comprises a deforming device configured to move the plurality of spoke members in a radial direction of the tire,
wherein the deforming device further comprises a guide plate comprising a plurality of guide rails into which the plurality of spoke members are respectively inserted,
wherein each of the plurality of spoke members comprises a pin passing through one end thereof, and
wherein the deforming device further comprises a cam member configured to rotate about the central axis of the tire, the cam member comprising a plurality of slits, each of the plurality of slits having a spiral shape,
wherein the pin of each of the plurality of spoke members is respectively inserted into each of the plurality of slits, and
wherein the cam member comprises:
a first cam member disposed on a first side of the guide plate,
a second cam member disposed on a second side of the guide plate, and
a connecting member connecting the first cam member and the second cam member to each other through the guide plate.

2. The wheel device of claim 1, wherein the deforming device comprises:
a camshaft connected to the cam member, and
a first motor configured to rotate the camshaft to move the pin along each of the plurality of slits.

3. The wheel device of claim 1, wherein each of the plurality of support members comprise:
a protrusion region convexly protruding from a first end of each of the plurality of support members and
a concave region positioned at a second end of each of the plurality of support members wherein the concave region has a shape configured to engage with the protrusion region.

4. The wheel device of claim 1, wherein the plurality of hollow pipes are arranged staggered in a zigzag pattern in the radial direction of the tire.

5. The wheel device of claim 1, wherein each of the plurality of hollow pipes has a rectangular parallelepiped shape.

6. The wheel device of claim 1, wherein the wheel member comprises a rim member supporting the inner layer of the tire that is configured to rotate integrally with the tire.

7. The wheel device of claim 6, wherein the rim member comprises:

a first rim member disposed on a first side of the plurality of spoke members, and a second rim member disposed on a second side of the plurality of spoke members.

8. The wheel device of claim 6, wherein the wheel member further comprises:

a wheel shaft connected to the rim member, and a second motor configured to rotate the wheel shaft.

9. The wheel device of claim 1, wherein, in the second position, an outer surface of the at least one of the plurality of support members is spaced apart from the inner layer.

10. The wheel device of claim 9, wherein, in the first position, the outer surface of the at least one of the plurality of support members is spaced apart from the inner layer.

11. The wheel device of claim 9, wherein, in the second position, the outer surface of the at least one of the plurality of support members is outside of the at least one groove.

12. A mobile robot device comprising:

a base; and at least three wheel devices installed on a lower portion of the base, wherein a wheel device from among the at least three wheel devices comprises:

a wheel member;

a tire disposed on the outside of the wheel member, the tire comprising an inner layer, an outer layer, and a plurality of hollow pipes disposed between the inner layer and the outer layer, wherein an inner circumferential surface of the inner layer comprises at least one groove;

a plurality of support members each having a circular arc shape; and a plurality of spoke members respectively connecting the wheel member to the plurality of support members, wherein the plurality of spoke members are configured to move the plurality of support members, relative to the at least one groove, between a first position and a second position, wherein, in the first position, each of the plurality of support members are disposed in the at least one groove, and wherein, in the second position, each of the plurality of support members are disposed closer to a central axis of the tire than when the plurality of support members are in the first position, wherein the wheel member comprises a deforming device configured to move the plurality of spoke members in a radial direction of the tire, wherein the deforming device further comprises a guide plate comprising a plurality of guide rails into which the plurality of spoke members are respectively inserted, wherein each of the plurality of spoke members comprises a pin passing through one end thereof, wherein the deforming device further comprises a cam member configured to rotate about the central axis of the tire, the cam member comprising a plurality of slits, each of the plurality of slits having a spiral shape, wherein the pin of each of the plurality of spoke members is respectively inserted into each of the plurality of slits, wherein the cam member comprises:

a first cam member disposed on a first side of the guide plate, a second cam member disposed on a second side of the guide plate, and a connecting member connecting the first cam member and the second cam member to each other through the guide plate; and wherein the deforming device comprises:

a camshaft connected to the cam member, and a first motor configured to rotate the camshaft to move the pin along each of the plurality of slits.

13. The mobile robot device of claim 12, further comprising:

an obstacle detection sensor configured to detect an obstacle around the mobile robot device; and a processor disposed in electronic communication with the obstacle detection sensor, the processor being configured to control the deforming device to move the plurality of support members to the second position when the processor determines that the obstacle exists in front of the mobile robot device based on a sensing value received by the obstacle detection sensor.

14. The mobile robot device of claim 12, wherein each of the plurality of support members comprise:

a protrusion region convexly protruding from a first end of each of the plurality of support members and a concave region positioned at a second end of each of the plurality of support members wherein the concave region has a shape configured to engage with the protrusion region.

15. The mobile robot device of claim 12, wherein the wheel member comprises:

a rim member supporting the inner layer of the tire that is configured to rotate integrally with the tire, a wheel shaft connected to the rim member, and a second motor configured to rotate the wheel shaft wherein the rim member comprises:

a first rim member disposed on a first side of the plurality of spoke members, and a second rim member disposed on a second side of the plurality of spoke members.

16. The mobile robot device of claim 12, wherein the plurality of hollow pipes are arranged staggered in a zigzag pattern in the radial direction of the tire, and wherein each of the plurality of hollow pipes has a rectangular parallelepiped shape.

* * * * *